Jan. 16, 1951     G. H. LEARY     2,538,369
MAGNETIC DAMPING DEVICE FOR BALANCES AND THE LIKE
Filed May 13, 1946     3 Sheets-Sheet 1

Inventor.
GORDON H. LEARY.
By Harry C. Liewter
Attorney.

Jan. 16, 1951             G. H. LEARY             2,538,369
MAGNETIC DAMPING DEVICE FOR BALANCES AND THE LIKE
Filed May 13, 1946             3 Sheets-Sheet 2
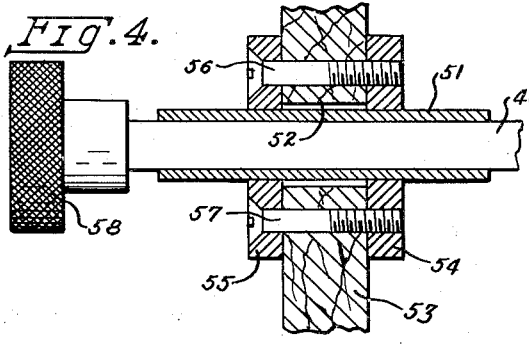
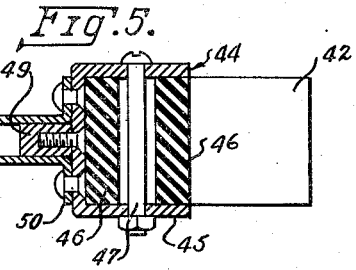
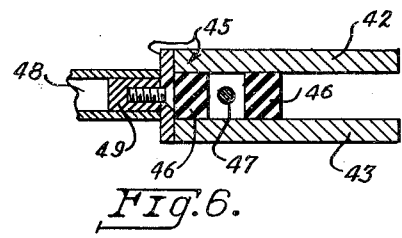
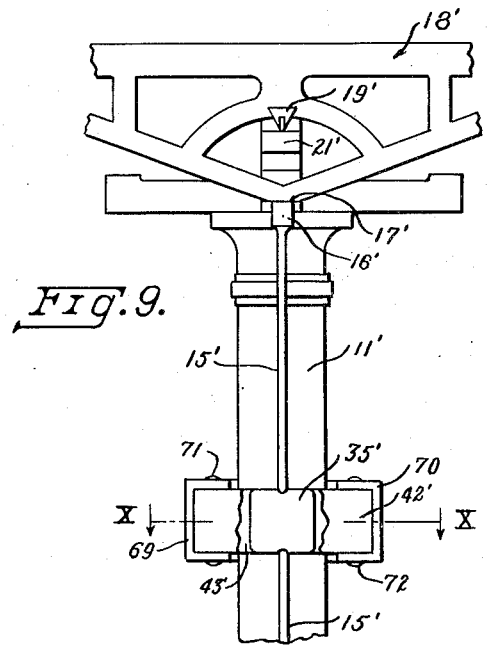
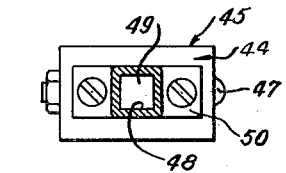
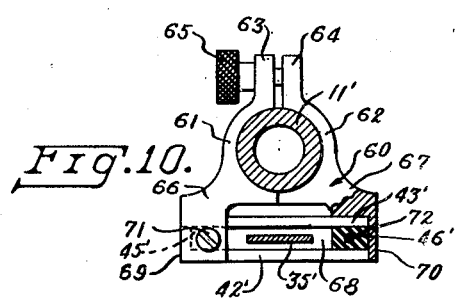
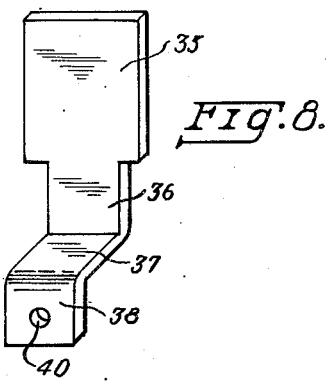
Inventor.
GORDON H. LEARY.
By Harry C. Leerts
Attorney.

Jan. 16, 1951 G. H. LEARY 2,538,369
MAGNETIC DAMPING DEVICE FOR BALANCES AND THE LIKE
Filed May 13, 1946 3 Sheets-Sheet 3
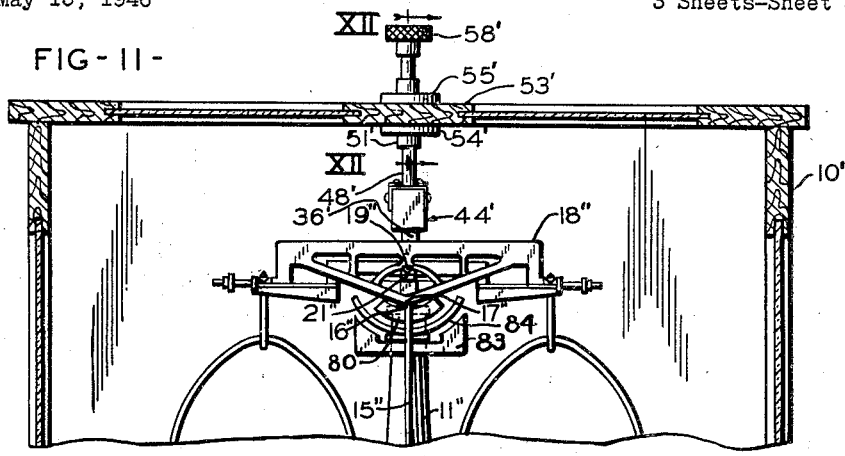
FIG-11-
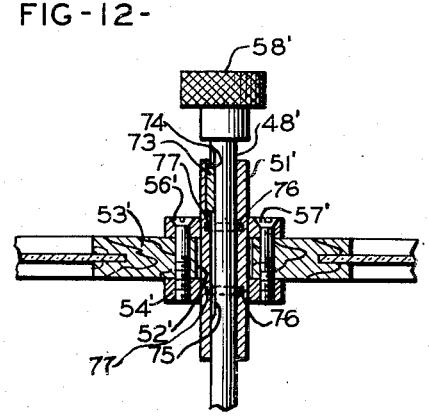
FIG-12-
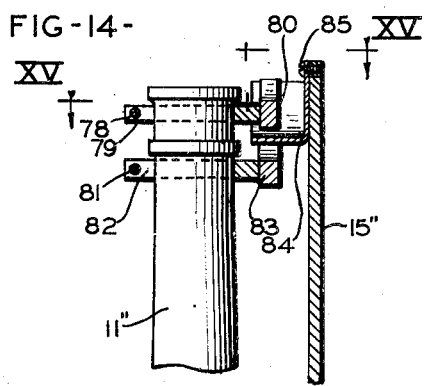
FIG-14-
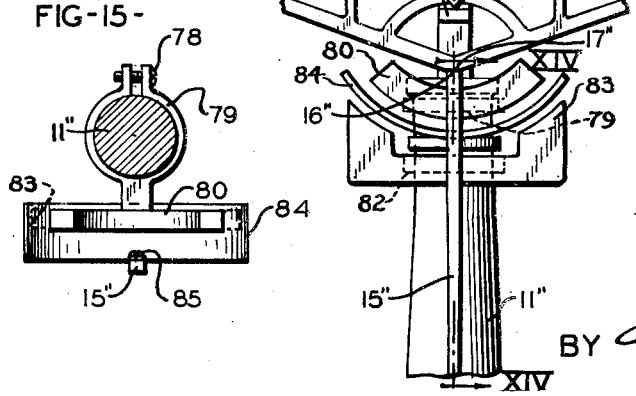
FIG-15-
FIG-13-
INVENTOR:
GORDON H. LEARY
BY
ATTY.

Patented Jan. 16, 1951

2,538,369

UNITED STATES PATENT OFFICE 2,538,369

MAGNETIC DAMPING DEVICE FOR BALANCES AND THE LIKE

Gordon H. Leary, Chicago, Ill.

Application May 13, 1946, Serial No. 669,244

3 Claims. (Cl. 265—54)

This invention relates to magnetic damping devices for analytical balances and the like, although certain features thereof may be employed with equal advantage for other purposes.

It contemplates more especially an improved magnetic damper for analytical balances and similar devices which have free swinging pendulum action unless restrained to accomplish the desired results within a minimum time lapse.

Numerous types of magnetic dampers have heretofore been proposed but these constitute attachments, for the most part, that either require counter-balancing or otherwise are cumbersome arrangements which do not lend themselves to delicate and sensitively balanced equipment. With the teachings of the present invention, the magnetic damper unit is compact, occupies a balanced position on the measuring beam and is subject to external control without requiring access to the surrounding case providing a constant atmosphere therefor.

One object of the present invention is to simplify the construction and improve the operation of devices of the character mentioned.

Another object is to provide an improved magnetic damper for analytical balances and the like.

Still another object is to provide an improved magnetic damper wherein the non-magnetic conductor occupies a balanced position on the beam for operation without impairment to the measuring functions thereof.

A further object is to provide an analytical balance with a magnetic damper having a non-magnetic conductor element in a balanced position on the moving elements thereof to eliminate any counter-balancing therefor.

A still further object is to provide an analytical balance or like instrument with a non-magnetic conductor for balanced swinging movement thereon in a controllable magnetic field.

Still a further object is to provide an analytical balance or like instrument with a non-magnetic conductor for balanced swinging movement thereon in a remote manually controllable magnetic field.

Other objects and advantages will appear from the following description of an illustrative embodiment of the present invention.

In the drawings:

Figure 4 is a fragmentary sectional view of the manual damper control taken substantially along line IV—IV of Figure 1.

Figure 5 is a fragmentary sectional view taken substantially along line V—V of Figure 2.

Figure 6 is a fragmentary sectional view taken substantially along line VI—VI of Figure 1.

Figure 7 is a fragmentary sectional view taken substantially along line VII—VII of Figure 1.

Figure 8 is a perspective view of the non-magnetic conductor shown in section in Figure 3.

Figure 9 is a fragmentary front view in elevation of an analytical balance embodying the modified magnetic damper in accordance with the teachings of the present invention.

Figure 10 is a fragmentary sectional view taken substantially along line X—X of Figure 9.

Figure 11 is a fragmentary front view in elevation of a modified embodiment of the remote magnet positioning member that is vertically rather than horizontally disposed to improve the magnetic damping action.

Figure 12 is a fragmentary sectional view of the manual remote control member taken substantially along line XII—XII of Figure 11.

Figure 13 is a fragmentary front view in elevation of a still further modified embodiment of a magnetic damping device.

Figure 14 is a fragmentary sectional view taken substantially along line XIV—XIV of Figure 13.

Figure 15 is a fragmentary plan sectional view taken substantially along line XV—XV of Figure 14.

Figures 1, 2, 3:
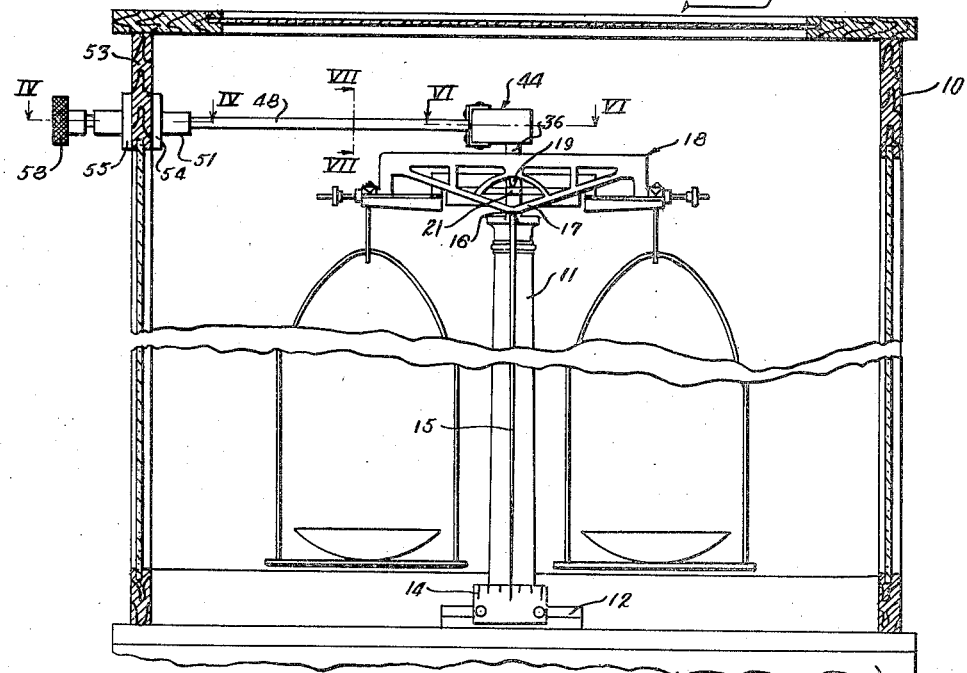
Figure 1 is a fragmentary front view in elevation of an analytical balance and a case therefor shown in section and equipped with a magnetic damper embodying features of the present invention.
Figure 2 is a fragmentary plan view of the analytical balance shown in Figure 1 with the case removed to clarify the showing.
Figure 3 is a fragmentary sectional view in elevation taken substantially along line III—III of Figure 2.

The structure selected for illustration is not intended to serve as a limitation upon the scope or teachings of the invention, but is merely illustrative thereof. There may be considerable variations and adaptations of all or part of the teachings depending upon the dictates of commercial practice.

The present embodiment comprises a magnetic damping device which is shown in association with any suitable type of analytical balance of which there are numerous types and designs. The illustrated analytical balance comprises a glazed case 10 of standard construction wherein is mounted a column 11 fixed to a column base 12 that, in turn, is attached to the case base 13 (Figure 1).

A graduated pointer index 14 is fixed to the column base 12 which is in the path of a balance pointer 15. The balance pointer 15 is attached at its upper end 16 to the downwardly converging apex 17 of a graduated horizontal beam 18. The horizontal beam 18 is fitted with the usual agate edged knife 19 which cooperates with an agate knife supporting plane 20 constituting a part of a column ledge 21 (Figure 3) that extends from the top of the column 11.

The column ledge 21 (Figure 3) has horizontally spaced furcations 22—23 supported on the column 11 to present horizontally spaced vertical slots 24 and 25—26, respectively, to receive complementary spaced and sized plates 27—28 and 29 which are formed integral with the arms 31—32 of the beam carrier 33. Beam carrier 33 is provided with lifting means (not shown) for lifting the beam 18 from its knife edge support 19. A rod 34 extends through the spaced furcations 22—23 for support therebetween to pivotally connect the carrier arm plates 27—28 and 29 for cooperation with a beam arrest (not shown). The graduated beam 18 which is oscillatably balanced through its central knife 19 on the plane 20, normally has prescribed periods of oscillation depending upon the sensitivity thereof and it has been found desirable to provide balances of this character with magnetic damping devices of various types. An improved magnetic damping device comprises a non-magnetic conductor plate 35 which is of substantially rectangular configuration (Figure 8) and preferably though not essentially is made from aluminum which is light and constitutes a good conductor of electricity.

The aluminum plate 35 is non-magnetic and is mounted in a balanced position on the beam 18. To this end, the non-magnetic damping plate 35 terminates in a reduced shank 36 that merges with a horizontal offset 37 having apertured vertical bracket arm 38 (Figure 8) which enables attachment to the beam 18. In the present embodiment, the bracket arm 38 has a threaded stud 39 extending through the aperture 40 in the damping plate bracket arm 38 for threaded engagement with the rearward surface 41 of the balance beam 18 exactly above the central knife 19 thereon. This serves to support the damping plate 35 in a vertical position and does not impair the balance of the beam 18. The damping plate 35 is positioned in the path of spaced permanent magnetic poles comprising part of the horizontally spaced arms 42—43 of a permanent magnet 44. The permanent magnet 44 has a substantially U-shaped bracket 45 (Figures 5 and 6) which receives the permanently magnetized plates 42—43 therebetween which are spaced by an insulator block 46 that is retained in assembled position with the U-shaped bracket 45 by means of a threaded bolt 47 that extends therethrough. This maintains the magnetized plates 42—43 in spaced assembled position within the bracket 45 that, in turn, is riveted or otherwise attached to an elongated tubular rod 48 (Figure 5) that preferably though not essentially is of rectangular cross-section.

A reinforcing block 49 is positioned in the end of the elongated tubular rod 48 for riveted connection to the magnet bracket 45 to insure a rigid connection between the flanged end 50 of the rod 48 and the bracket 45 of the permanent magnet 44. The elongated rod 48 extends through an elongated complementary bushing 51 that extends through an aperture 52 in a side wall 53 of the case 10 for support by confronting plates 54—55 disposed on both sides of the case wall 53 for retention in position by means of suitable fasteners 56—57. The fasteners 56—57 extend through the confronting plates 54—55 and the case wall 53 to securely mount the elongated bushing 51 in a horizontal position thereto. The elongated bushing 51 slidably supports the tubular rod 48 which extends externally of the case 10 to receive a finger manipulating knob 58 thereon. The knob 58 enables the magnet supporting rod 48 to be slidably displaced in the complemental elongated bushing 51 without turning movement therein by reason of the substantially square complemental configuration of the rod 48 and the interior of the bushing 51.

This provides for the remote position control of the magnet 44 that can be placed in the path of the non-magnetic conductor plate 35 balanced on the beam 18 to dampen the swinging movement thereof during the use of the balance. In the position substantially as shown in Figure 2, the magnetic lines of flux of the magnet 44 induce a current in the non-magnetic conductor plate 35 to serve as a damping influence on the beam 18 and the pointer 15 connected therewith. When it is desired to vary the extent of this influence one way or the other or to entirely render the damping device inoperative, the magnet supporting rod 48 is displaced from the path of the non-magnetic conductor plate 35 for any distance without requiring access to the interior of the case 10. It will be apparent, therefore, that a simple and effective damping device has been provided which is remotely controllable without requiring access to the interior case 10 nor does this construction require any counterbalancing weights in the operation thereof.

In the modified embodiment shown in Figures 9 and 10, the balance column 11' is provided with a split bracket 60 having complemental confronting arms 61—62 to receive the column 11' (Figure 10) for retention thereon. To this end, the complemental bracket clamping arms 61—62 terminate in spaced confronting ears 63—64 through which a threaded fastener such as a thumb screw 65 extends to effect their connection and separation so that the bracket 60 can be attached to any portion of the column 11' intermediate the upper and lower extremities thereof.

As shown, the clamping arms 61—62 of the bracket 60 extend forwardly to merge in spaced supporting arms 66—67 formed integral therewith to provide the space 68 therebetween in the path of the pointer 15' which extends downwardly from the inverted apex 17' of the balanced beam 18'. In the present embodiment, the pointer 15' carries a flat thin non-magnetic conductor plate 35' that is attached thereto at any point along its length to oscillate with the pointer 15' in the space 68 between the supporting arms 66—67 of the bracket 60 (Figure 10). Spaced permanently magnetized plates 42'—43' are disposed transversely between the bracket supporting arms 66—67 in parallel spaced relation with the non-magnetic conductor plate 35' disposed therebetween to oscillate or swing in the path parallel thereto without contact therewith. The magnetized parallel plates 42'—43' are maintained in spaced relation by means of insulator spacer blocks 45'—46' and are fitted with the plates 42'—43' to the non-magnetic bracket supporting arms 66—67, for confinement by the confronting C-shaped end brackets 69—70 (Figure 9). The C-shaped end brackets 69—70 embrace the ends of the bracket supporting arms 66—67 and the vertical spaced permanent magnetized plates 42'—43' with the spacer blocks 45'—46' therebetween for contact therewith to enclose a magnetic field therearound and to retain the permanent magnitized plates 42'—43' in contact and attachment to the non-magnetic bracket supporting arms 66—67.

To this end, elongated rivets or threaded studs or other suitable fasteners 71—72 extend vertically through the arms of the C-shaped end brackets 69—70 and the spacer blocks 45'—46' to retain the permanent magnetized plates 42'—43' in proper spaced supported attachment to the non-magnetic bracket supporting arms 66—67. With this arrangement, the non-magnetic conductor plate 35' freely oscillates in a magnetic field to arrest swinging movement of the pointer 15' and to serve as a magnetic damper therefor.

In the modified embodiment shown in Figure 11, the casing 10' is provided with an intermediate transverse wood member 53' which supports two equally sized glass panes in lieu of the single pane shown in Figure 1. The intermediate rib member 53' serves as a mount for the vertically disposed position control rod 48' which is vertically slidable in a vertical sleeve 51' fixed to confronting plates 54'—55' disposed on both sides of the casing rib 53'. Suitable fasteners 56'—57' retain the confronting plates 54'—55' attached to the casing rib member 53'. In this instance, the elongated rod 48' is retained against rotation by complemental key 73 and keyway 75 (Figure 12) precluding relative rotation between the fixed sleeve 51' and the elongated rod 48'.

Vertically spaced split rings 76, in this instance two, are disposed in angular grooves 77 provided in the fixed vertical sleeve 51' to frictionally retain the elongated vertical rod 48' in any adjusted vertical position to support the permanent magnet 44' fixed to the lower extremity thereof. This enables the permanent magnet 44' to be vertically adjusted as to position by effecting upward or downward displacement of the elongated rod 48' through the manipulation of the exteriorly accessible knob 58'. With this arrangement, the permanent magnet 44' can be held in any one of many adjusted positions relative to the non-magnetic conductor plate 36' to provide a uniform magnetic field in the path thereof. This arrangement affords a better balanced magnetic flux influence on the non-magnetic conductor plate 36'.

There may also be provided an arcuate non-magnetic conductor plate 84 that is fixed to the pointer 15'' (Figures 13 and 14) for disposition between correspondingly arcuate permanent magnetic poles 80—83 that are fixed by split brackets 79—82, respectively, to the column 11'' that is usually constructed from non-magnetic material such as brass. Threaded fasteners 78—81 are disposed through the split brackets 79—82 for attachment of the arcuate permanent magnetic poles 80—83 to support column 11'' (Figures 13 and 14) to maintain a spaced relation sufficient to freely receive the correspondingly arcuate non-magnetic conductor plate 84 therebetween.

It should be noted that the curvature of the permanent magnets 80—83 and the non-magnetic conductor plate 84 disposed therebetween, are disposed from the same center 19'' constituting the fulcrum of the balanced beam 18''. This enables the beam 18'' to oscillate with the non-magnetic conductor plate 84 in a balanced position relative thereto for rotary swinging movement between the permanent magnets 80—83. This arrangement of permanent magnetics may be independent of or in conjunction with the permanent magnet 44' depending upon the dictates of commercial practice. These modified embodiments afford greater flexibility in the damping action of the balanced beam 18''; however, one or the other of the damping expedients may be employed depending upon the particular uses and purposes as well as the capacity of any particular balance or balances.

It should be noted that in all the embodiments herein illustrated and described, there is involved the positioning of a non-magnetic conductor in balanced relation to the beam or appendages thereof so that no counter-balancing elements need be associated with any portion of the balance. This simplifies the construction and provides a balance that is not impeded with auxiliary counter-balancing elements.

While I have illustrated and described a preferred embodiment of this invention, it must be understood that the invention is capable of considerable variation and modification without departing from the spirit of the invention. I, therefore, do not wish to be limited to the precise details of construction set forth, but desire to avail myself of such variations and modifications as come within the scope of the appended claims.

I claim:

1. In a balance having a column, a balanced beam structure supported on said column by means of a knife edge said structure including a pointer for measuring the angular displacement of said beam during oscillating movement of the beam about said edge, a magnetic damping device comprising a non-magnetic conductor secured to said beam structure in balance with said beam directly underlying and closely spaced from said knife edge, a permanent magnet directly overlying said conductor and a second permanent magnet directly underlying said conductor, said magnets being secured to said column, said magnets and said conductor being arcuate in contour and having a common center of curvature at said knife edge to permit oscillatory movement of said non-magnetic conductor with said beam structure, whereby movement of said non-magnetic conductor through the magnetic field of said magnet serves to damp the oscillation of said beam.

2. In combination, a balance having a column and a balanced beam structure supported on said column for oscillating movement about a knife edge, and a magnetic damping device comprising a non-magnetic arcuate plate conductor secured to said beam structure adjacent said knife edge and symmetrically arranged with respect thereto to be in balance and central vertical alignment therewith when said beam is at rest, said conductor having its center of longitudinal curvature at said knife edge, and a pair of permanent magnets supported by said column and having fixed pole pieces extending on either side of said conductor and each having a center of curvature common with said conductor to provide a magnetic field acting upon said conductor, whereby movement of said conductor through said field during oscillating movement of the beam serves to damp the movement of said beam.

3. In combination, a balance having a column, a balanced beam supported on said column for oscillating movement about a fulcrum and a pointer for measuring the angular displacement of said beam during oscillating movement of the same, and a magnetic damping device comprising an arcuate non-magnetic conductor secured to said pointer in a position closely underlying the fulcrum of said beam, said conductor having its center of gravity located in a vertical plane extending through said fulcrum when said beam is at rest and its center of curvature at said fulcrum, an arcuate permanent magnet having the same center of curvature as said conductor and fixedly secured to said column in position closely overlying said conductor and a second arcuate permanent magnet having the same center of curvature as said conductor and fixedly secured to said column to closely underlie said conductor, whereby movement of said conductor through the magnetic field of said magnet during oscillating movement of said pointer serves to damp said movement.

GORDON H. LEARY.

REFERENCES CITED

The following references are of record in the file of this patent:

UNITED STATES PATENTS

| Number | Name | Date |
|---|---|---|
| 502,433 | Gibboney | Aug. 1, 1893 |
| 1,686,909 | Frayne et al. | Oct. 9, 1928 |
| 1,900,641 | Gattoni | Mar. 7, 1933 |
| 1,937,223 | Gattoni | Nov. 28, 1933 |
| 2,036,689 | Gattoni | Apr. 7, 1936 |
| 2,081,252 | Seederer | May 25, 1937 |